US010271352B2

(12) United States Patent
Coffey et al.

(10) Patent No.: US 10,271,352 B2
(45) Date of Patent: Apr. 23, 2019

(54) WIRELESS COMMUNICATION SYSTEM AND ASSOCIATED WIRELESS COMMUNICATION METHOD AND WIRELESS DEVICE HAVING EFFICIENT POLLING MECHANISM IN OVERLAPPING NETWORK ENVIRONMENTS

(71) Applicant: Realtek Semiconductor Corp., HsinChu (TW)

(72) Inventors: John Timothy Coffey, San Francisco, CA (US); Der-Zheng Liu, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 15/452,697

(22) Filed: Mar. 7, 2017

(65) Prior Publication Data

US 2018/0027586 A1 Jan. 25, 2018

Related U.S. Application Data

(60) Provisional application No. 62/364,277, filed on Jul. 19, 2016.

(51) Int. Cl.
*H04L 12/403* (2006.01)
*H04W 74/02* (2009.01)
*H04W 88/00* (2009.01)
*H04W 72/04* (2009.01)
*H04W 74/06* (2009.01)
(Continued)

(52) U.S. Cl.
CPC ......... *H04W 74/02* (2013.01); *H04L 12/4035* (2013.01); *H04W 72/0446* (2013.01); *H04W 74/06* (2013.01); *H04W 88/00* (2013.01); *H04W 28/0294* (2013.01); *H04W 36/0072* (2013.01); *H04W 36/0077* (2013.01); *H04W 48/20* (2013.01)

(58) Field of Classification Search
CPC ... H04L 12/2678; H04L 43/10; H04L 1/0001; H04L 12/4035; H04N 1/32032; H04N 1/1685; H04W 74/06; H04W 88/00; H04W 48/20; H04W 36/0072; H04W 36/0077; H04W 28/0294
See application file for complete search history.

(56) References Cited

U.S. PATENT DOCUMENTS

| | | |
|---|---|---|
| 5,920,571 A | 7/1999 | Houck |
| 6,038,213 A | 3/2000 | Albrow |

(Continued)

FOREIGN PATENT DOCUMENTS

| | | |
|---|---|---|
| CN | 1770731 A | 5/2006 |
| CN | 1820436 A | 8/2006 |

(Continued)

*Primary Examiner* — Salvador E Rivas
(74) *Attorney, Agent, or Firm* — Winston Hsu (57) ABSTRACT

A wireless communication system under a contention-based protocol comprises an access point and at least one station, wherein the station is arranged for wirelessly communicating with the access point under the contention-based protocol. In the operations of the wireless communication system, the access point broadcasts a polling usage sequence to assign a time slot for the station, and the station subsequently uses the assigned time slot to transmit a data packet to the access point.

16 Claims, 5 Drawing Sheets

(51) Int. Cl.
*H04W 28/02* (2009.01)
*H04W 36/00* (2009.01)
*H04W 48/20* (2009.01)

(56) References Cited

U.S. PATENT DOCUMENTS

| | | |
|---|---|---|
| 6,717,916 B1 | 4/2004 | Ahn |
| 6,795,418 B2 | 9/2004 | Choi |
| 6,912,212 B1 | 6/2005 | Young |
| 6,920,128 B1 | 7/2005 | Haugli |
| 6,963,549 B1 | 11/2005 | Jayaraman |
| 7,164,671 B2 | 1/2007 | del Prado |
| 7,406,327 B2 | 7/2008 | Kroon |
| 7,620,404 B2 | 11/2009 | Chesnais |
| 8,891,494 B2 | 11/2014 | Barghi |
| 9,173,196 B2 | 10/2015 | Grimm |
| 9,648,613 B2 | 5/2017 | Choi |
| 9,661,683 B2 | 5/2017 | Horneman |
| 9,706,551 B2 | 7/2017 | Jeong |
| 2002/0080768 A1* | 6/2002 | Garcia-Luna-Aceves ................... H04W 74/06 370/349 |
| 2003/0095528 A1 | 5/2003 | Halton |
| 2003/0142636 A1 | 7/2003 | Su |
| 2004/0090983 A1 | 5/2004 | Gehring |
| 2006/0029073 A1* | 2/2006 | Cervello ........... H04W 74/0816 370/389 |
| 2006/0239272 A1 | 10/2006 | Heidari-Bateni |
| 2008/0089311 A1 | 4/2008 | Roy |
| 2008/0259895 A1 | 10/2008 | Habetha |
| 2010/0061314 A1 | 3/2010 | Oh |
| 2010/0203936 A1 | 8/2010 | Levy |
| 2010/0220683 A1 | 9/2010 | Novak |
| 2011/0222517 A1 | 9/2011 | Ishii |
| 2011/0230223 A1 | 9/2011 | Lu |
| 2011/0261764 A1 | 10/2011 | Shirakata |
| 2013/0195036 A1 | 8/2013 | Quan |
| 2013/0235784 A1 | 9/2013 | Kim |
| 2013/0244571 A1 | 9/2013 | Hong |
| 2013/0294427 A1 | 11/2013 | Kim |
| 2014/0003414 A1* | 1/2014 | Choudhury ......... H04W 74/006 370/347 |
| 2014/0082353 A1 | 3/2014 | Everhart |
| 2014/0140264 A1* | 5/2014 | Lv ..................... H04W 74/0816 370/312 |
| 2014/0198642 A1 | 7/2014 | Barriac |
| 2014/0334458 A1 | 11/2014 | Park |
| 2015/0049644 A1 | 2/2015 | Lee |
| 2015/0117365 A1 | 4/2015 | Merlin |
| 2015/0131570 A1 | 5/2015 | Kwon |
| 2015/0334742 A1 | 11/2015 | Kim |
| 2015/0382283 A1 | 12/2015 | Wang |
| 2016/0044542 A1 | 2/2016 | Kovács |
| 2016/0073433 A1 | 3/2016 | Kwon |
| 2016/0088665 A1 | 3/2016 | Kim |
| 2016/0128061 A1 | 5/2016 | Coffey |
| 2016/0128062 A1 | 5/2016 | Coffey |
| 2016/0249383 A1 | 8/2016 | Kwon |

FOREIGN PATENT DOCUMENTS

| | | |
|---|---|---|
| CN | 1996813 A | 7/2007 |
| CN | 101208915 A | 6/2008 |
| CN | 100505730 C | 6/2009 |
| CN | 101569123 A | 10/2009 |
| CN | 101730282 A | 6/2010 |
| WO | 2006/115673 A1 | 11/2006 |

\* cited by examiner

WIRELESS COMMUNICATION SYSTEM AND ASSOCIATED WIRELESS COMMUNICATION METHOD AND WIRELESS DEVICE HAVING EFFICIENT POLLING MECHANISM IN OVERLAPPING NETWORK ENVIRONMENTS

CROSS REFERENCE TO RELATED APPLICATIONS

This application claims the priority of U.S. Provisional Application No. 62/364,277, filed on Jul. 19, 2016, which is included herein by reference in its entirety.

BACKGROUND OF THE INVENTION

1. Field of the Invention

The present invention relates to a wireless communication system, and more particularly, to a communication method between an access point and one or more stations of the wireless communication system.

2. Description of the Prior Art

Many wired and wireless networks enable multiple access using distributed channel access mechanisms. In a typical instantiation, such as that used in the IEEE 802.11 set of protocols, devices that share access to the wireless medium, and that wish to transmit, will independently choose a number of transmission-available time slots (a 'backoff') to delay before attempting to transmit a packet. A new backoff is chosen for each new packet. Each device's new backoff is randomly (or pseudo-randomly) chosen from a set of possible backoffs determined by the protocol. Different devices will (usually) choose different backoffs (because the backoff choices are made independently on each transmitter), and then the devices will not attempt to transmit at the same time. In this way the protocol allows for different devices that implement the same underlying protocol to transmit at different times, without any explicit sequence of negotiation or arbitration messages. This is a "distributed" coordination channel access mechanism.

However, two or more devices may choose the same backoff value. In this case a "collision" will occur.

For this distributed coordination system to work effectively, the number of available backoff slots must be appreciably greater than the number of different devices actively seeking to transmit at a given time. First, unless there are as many available backoff slots as devices actively seeking to transmit, it will be impossible for each device to choose a different backoff slot. Secondly, if the number of devices actively seeking to transmit is large, and the number of backoff slots equals only slightly exceeds the number of devices, it will be highly improbable for a satisfactory outcome to occur.

When there are overlapping distinct wireless networks (Overlapping Basic Service Sets (OBSSs) in the terminology of IEEE 802.11), a given device may determine that the wireless medium is busy due to transmissions in a different wireless network. A given device, hereinafter "station", may be greatly restricted in its ability to access the medium through the backoff protocol by the presence of heavy traffic from OBSSs in its vicinity.

In many wireless protocols, including IEEE 802.11, it is possible for an intended recipient to gain access to the wireless medium and to 'poll' the station. The intended recipient (for example, a central controller or an access point) sends a packet that reserves the wireless medium (at least as far as all devices that can hear that intended recipient are concerned) for sufficient time for the station to begin its desired transmission. However, this method appreciably increases protocol overhead, in proportion to the degree to which the wireless medium is busy in the vicinity of the starved station. Even when it receives a poll from the intended recipient, the station is still unable to begin transmission if it determines that the wireless medium is still busy at the time it is about to start transmitting. Thus for a successful poll, the intended recipient must send the poll message at a time such that the station's reply will begin at a time when the station will determine the wireless medium to be idle. Generally the intended recipient cannot determine whether the station will determine a busy medium because of the hidden node problem, and so there will also be some number of unsuccessful polls before a successful poll occurs. For example, in a very busy environment it may be that the station will only see an idle wireless medium for 10% of the time the intended recipient may transmit, greatly increasing the protocol overhead.

SUMMARY OF THE INVENTION

It is therefore an objective of the present invention to provide a protocol of operation and/or an access method between an access point and a station of the wireless communication system, which may allow more efficient polling of devices in environments characterized by overlapping networks and hidden nodes, to solve the above-mentioned problems.

According to one embodiment of the present invention, a wireless communication system under a contention-based protocol comprises an access point and at least one station, wherein the station is arranged for wirelessly communicating with the access point under the contention-based protocol. In the operations of the wireless communication system, the access point broadcasts a polling usage sequence to assign a time slot for the station, and the station subsequently uses the assigned time slot to transmit a data packet to the access point.

According to another embodiment of the present invention, a wireless communication method of a wireless device using a contention-based protocol comprises: wirelessly receiving a polling usage sequence that assigns a time slot for the wireless device; and using the assigned time slot to transmit a data packet to an access point.

According to another embodiment of the present invention, a wireless device using a contention-based protocol comprises a circuitry configured to: wirelessly receiving a polling usage sequence that assigns a time slot for the wireless device; and using the assigned time slot to transmit a data packet to an access point.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
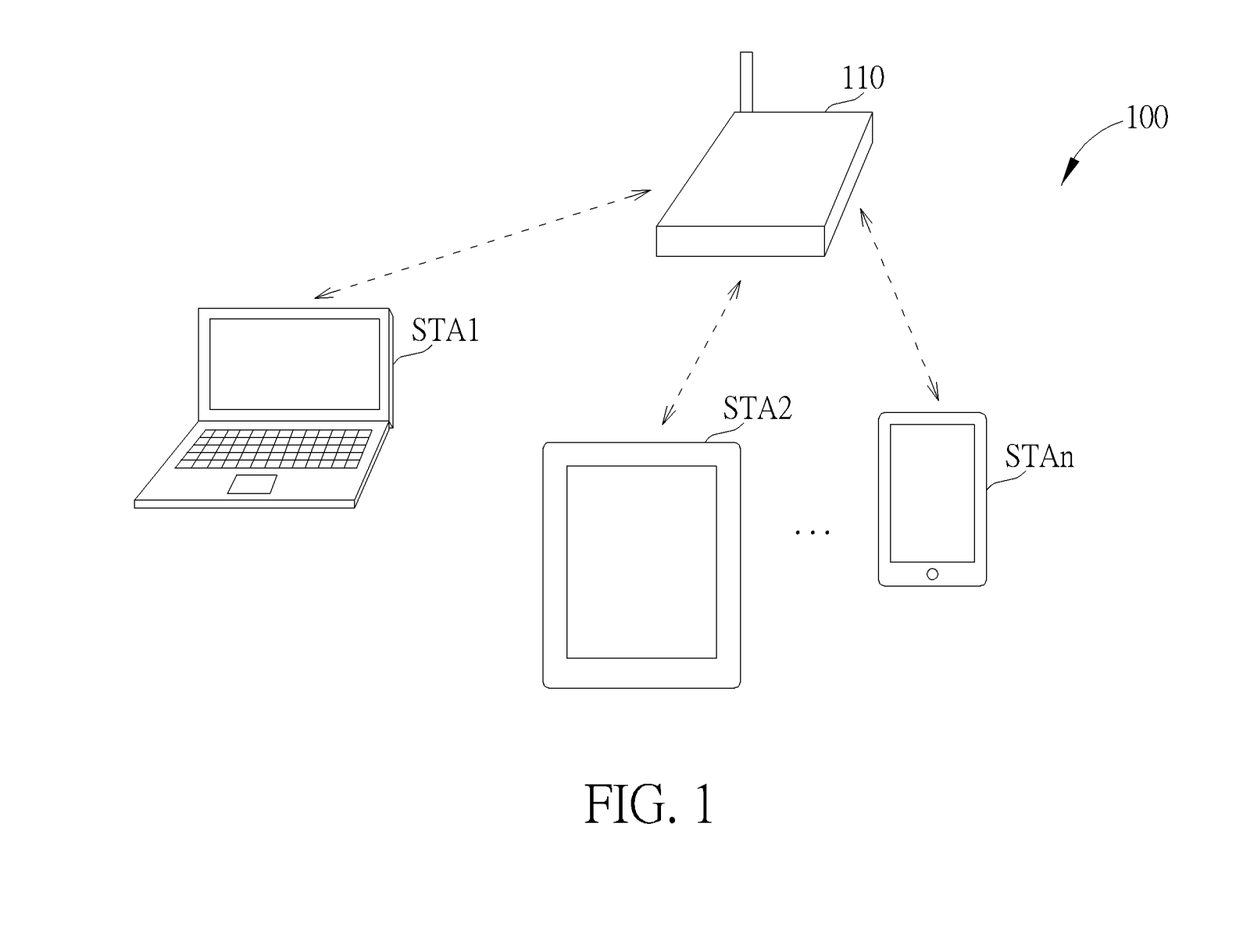
FIG. 1 is a diagram illustrating a wireless communication system according to one embodiment of the present invention.

Please refer to FIG. 1, which is a diagram illustrating a wireless communication system 100 according to one embodiment of the present invention. As shown in FIG. 1, the wireless communication system 100 comprises an access point (AP) 110 and a plurality of wireless devices named stations STA1-STAn. In this embodiment, the AP 110 is wirelessly connected to the stations STA1-STAn, and allows the stations STA1-STAn to connect to a wired network using WiFi or other related standards; and each of the stations STA1-STAn can be any client device such as notebook, laptop, smartphone, tablet or any other electronic device capable of wirelessly connecting to the AP 110.

Figure 2:
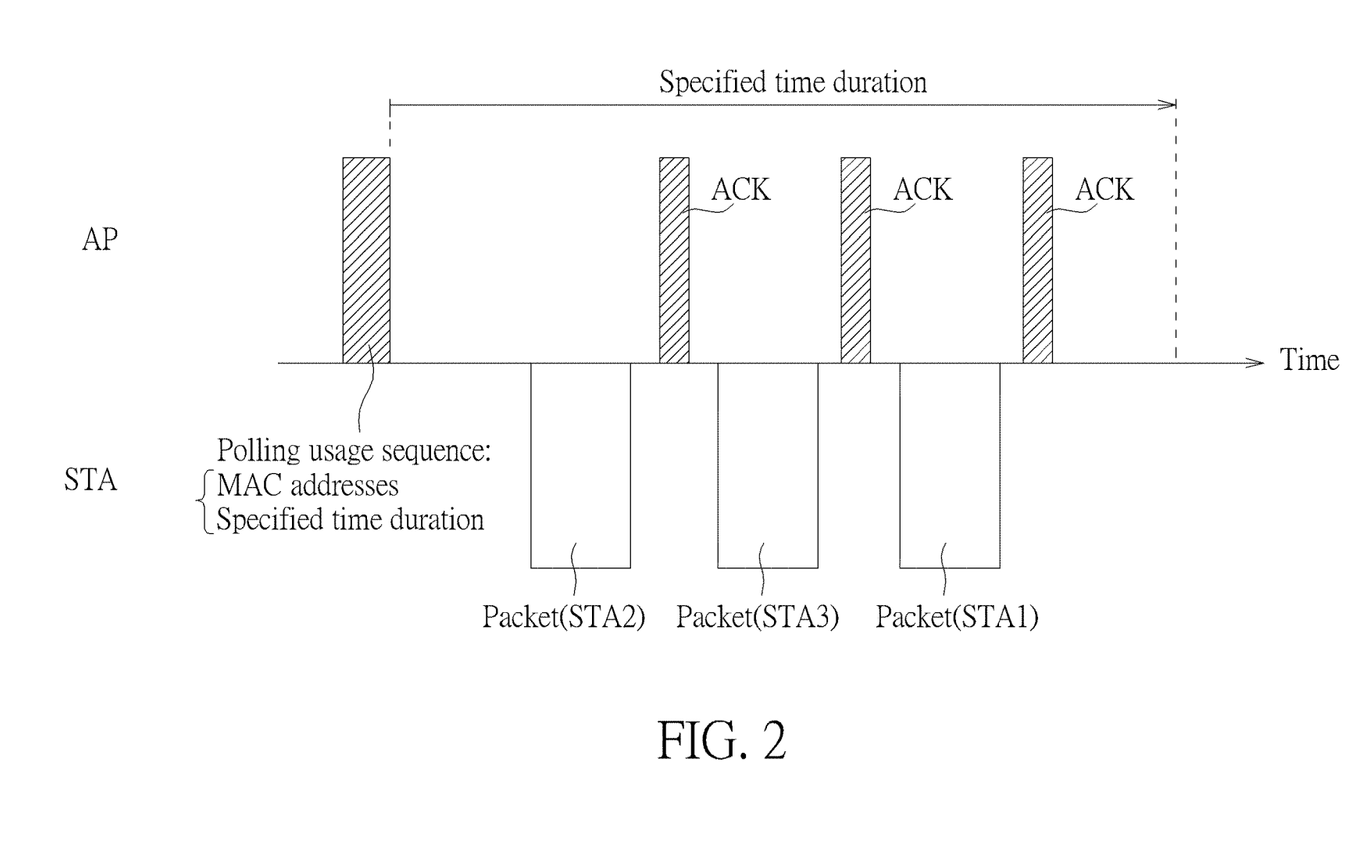
FIG. 2 is a diagram illustrating a timing diagram of communications between the AP and the stations according to one embodiment of the present invention.

Please refer to FIG. 2, which is a diagram illustrating a timing diagram of communications between the AP 110 and the stations STA1-STAn according to one embodiment of the present invention. In this embodiment, it is assumed that the AP 110 and the stations STA1-STAn have built links, respectively. Referring to FIG. 2, the AP 110 actively broadcasts a polling usage sequence for assigning time slots of at least a portion of the stations STA1-STAn, wherein the polling usage sequence comprises a sequence of Media Access Control (MAC) addresses and a specified time duration. In this embodiment, the specified time duration is reserved for data transmission between the AP 110 and the stations STA1-STAn, and sequence numbers of MAC addresses serve as the assigned time slots of the stations STA1-STAn, respectively. For example, the following table 1 shows the sequence of MAC addresses and the corresponding time slots and stations according to one embodiment of the present invention.

TABLE 1

| Sequence number | MAC address | Stations | Assigned time slots |
|---|---|---|---|
| 1 | XX-XX . . . | STA2 | #1 |
| 2 | YY-YY . . . | STA3 | #2 |
| 3 | ZZ-ZZ . . . | STA1 | #3 |

The polling usage sequence broadcasted by the AP 110 only comprises the information of the "sequence number" and "MAC address" shown in table 1, and when the stations STA1-STAn receive the polling usage sequence, each station determines whether its own MAC address appears in the polling usage sequence, and only the station(s) whose MAC address appears in the polling usage sequence is/are allowed to transmit data packet to the AP 110. In the embodiment shown in table 1, the stations STA2, STA3 and STA1 are corresponding to the MAC addresses having sequence numbers 1-3, respectively, so the stations STA2, STA3 and STA1 are assigned to have the time slots #1, #2 and #3, respectively. Other stations not appeared in the polling usage sequence are not allowed to transmit data packet to the AP 110 during the specified time duration.

It is noted that the aforementioned time slot is determined and assigned by the AP 110, and all of the stations STA1-STAn are not involve with the determination of the time slot. In addition, the time slots #1-#3 are not a limitation of the present invention, in other embodiments, the assigned time slots of the stations STA2, STA3 and STA1 can be #1, #3, #5, respectively, or any other suitable values whose intervals are relatively small.

After the stations STA1-STA3 receive the polling usage sequence, each station directly uses the assigned time slot to transmit the data packet to the AP 110. For example, because the station STA2 has the assigned time slot #1, the station STA2 directly uses the time slot #1 to transmit the data packet to the AP 110, that is the station STA2 starts the data transmission when a backoff counter of station STA2 reduced from one to zero; and after receiving the data packet from the station STA2, the AP 110 responds with an acknowledgement ACK (if necessary under the acknowledgement policy in operation). Similarly, because the station STA3 has the assigned time slot #2, the station STA3 subsequently uses the time slot #2 to transmit the data packet to the AP 110, that is the station STA3 starts the data transmission when a backoff counter of station STA3 reduced from two to zero; and after receiving the data packet from the station STA3, the AP 110 responds with an acknowledgement ACK. Similarly, because the station STA1 has the assigned time slot #3, the station STA1 subsequently uses the time slot #3 to transmit the data packet to the AP 110, that is the station STA1 starts the data transmission when a backoff counter of station STA1 reduced from three to zero; and after receiving the data packet from the station STA1, the AP 110 responds with an acknowledgement ACK.

The data packet transmitted by the station STA2, STA3 or STA1 may be a full data packet or a packet comprising management data provided by a management frame.

In addition, while one station (e.g. station STA2) transmits its packet, all other stations STAs following the station decodes the packet duration field of the station STA2's packet and freezes its time countdown: that is, stations STA1 and STA3 does not count down backoff slots for that duration.

It is noted that when it is at the assigned time slot and the station is eligible to transmit the data packet, the station determines whether a wireless medium is busy or not (i.e. whether the wireless medium is occupied by the other devices), and the station transmits the data packet to the AP 110 only when the wireless medium is not busy. In addition, when the wireless medium is busy, the station does not transmit the data packet to the AP 110, and the station is not eligible to transmit the data packet until the AP 110 broadcasts a next polling usage sequence to assign another time slot for the station, that is the station will not transmit the data packet during the current specified time duration.

Here and throughout the present disclosure, the use of "time slot" should be taken as equivalent to "available backoff slot". Common wireless protocols, including notably IEEE 802.11, include additional inter-frame-spaces of varying lengths before backoff slots to facilitate operations such as clear-channel-assessment ("CCA"), transmitter-to-receiver and receiver-to-transmitter turnaround time, and others. These (with appropriately modified durations) may also be usefully used in combination with the present invention.

Figure 3:
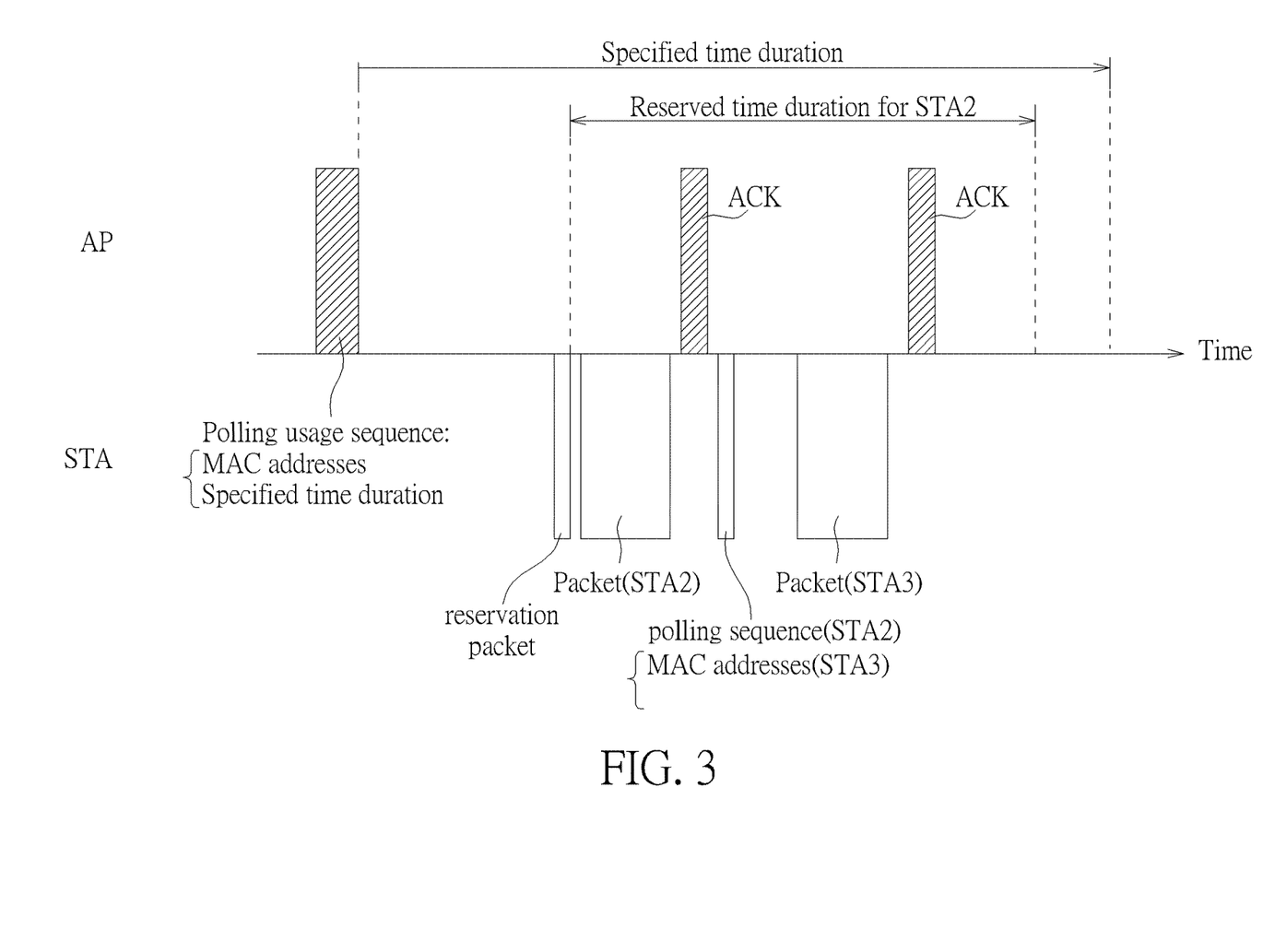
FIG. 3 is a diagram illustrating a timing diagram of communications between the AP and the stations according to another embodiment of the present invention.

Please refer to FIG. 3, which is a diagram illustrating a timing diagram of communications between the AP 110 and the stations STA1-STAn according to another embodiment of the present invention. In this embodiment, it is assumed that the AP 110 and the stations STA1-STAn have built links, respectively. Referring to FIG. 3, the AP 110 actively broadcasts a polling usage sequence for assigning time slots of at least a portion of the stations STA1-STAn, wherein the polling usage sequence comprises a sequence of MAC addresses and a specified time duration. Similar to the embodiment shown in FIG. 2, the sequence numbers of MAC addresses serve as assigned time slots of at least a portion of the stations STA1-STAn.

In the embodiment shown in FIG. 3, the station STA2 has an assigned time slot, and when it is at the assigned time slot and the station STA2 is eligible to transmit the data packet, the station STA2 reserves a time duration by sending a reservation packet, and the station STA2 only uses a portion of the time duration to transmit the data packet to the AP 110. After the data packet transmission finishes and the station STA2 receive an acknowledgement ACK from the AP 110, the station STA2 further broadcasts a polling sequence to a portion of the other stations, such as the station STA3 shown in FIG. 3, to notify that it is allowed to communicate with the AP 110, where the polling sequence broadcasted by the station STA2 may comprises the MAC address corresponding to the station STA3 and/or its assigned time slot. After receiving the polling sequence, the station STA3 may transmits the data packet to the AP 110 during the remaining portion of the reserved time duration of the station STA2; and after receiving the data packet from the station STA3, the AP 110 responds with an acknowledgement ACK.

In the aforementioned embodiment, if the station STA1 can communicate with another wireless device, but the other wireless device and the AP 110 are hidden nodes to each other (that is the other wireless device and the AP 110 cannot hear each other), a collision problem may occurs when the other wireless device transmits data packet to the station STA1 while the station STA1 transmits the data packet to the AP 110. To avoid this collision issue, when it is at the assigned time slot and the station is eligible to transmit the data packet, the station broadcasts a clear-to-send (CTS) packet to reserve a time duration and notify the other wireless device (i.e. hidden node of the AP 110) that the wireless medium is occupied during the reserved time duration. In detail, please refer to FIG. 4, when it is at the assigned time slot, the station STA2 sends the CTS packet to reserve a time duration, and after receiving an acknowledgment ACK from the AP 110, the station STA2 starts to transmit the data packet to the AP 110.

Figure 4:
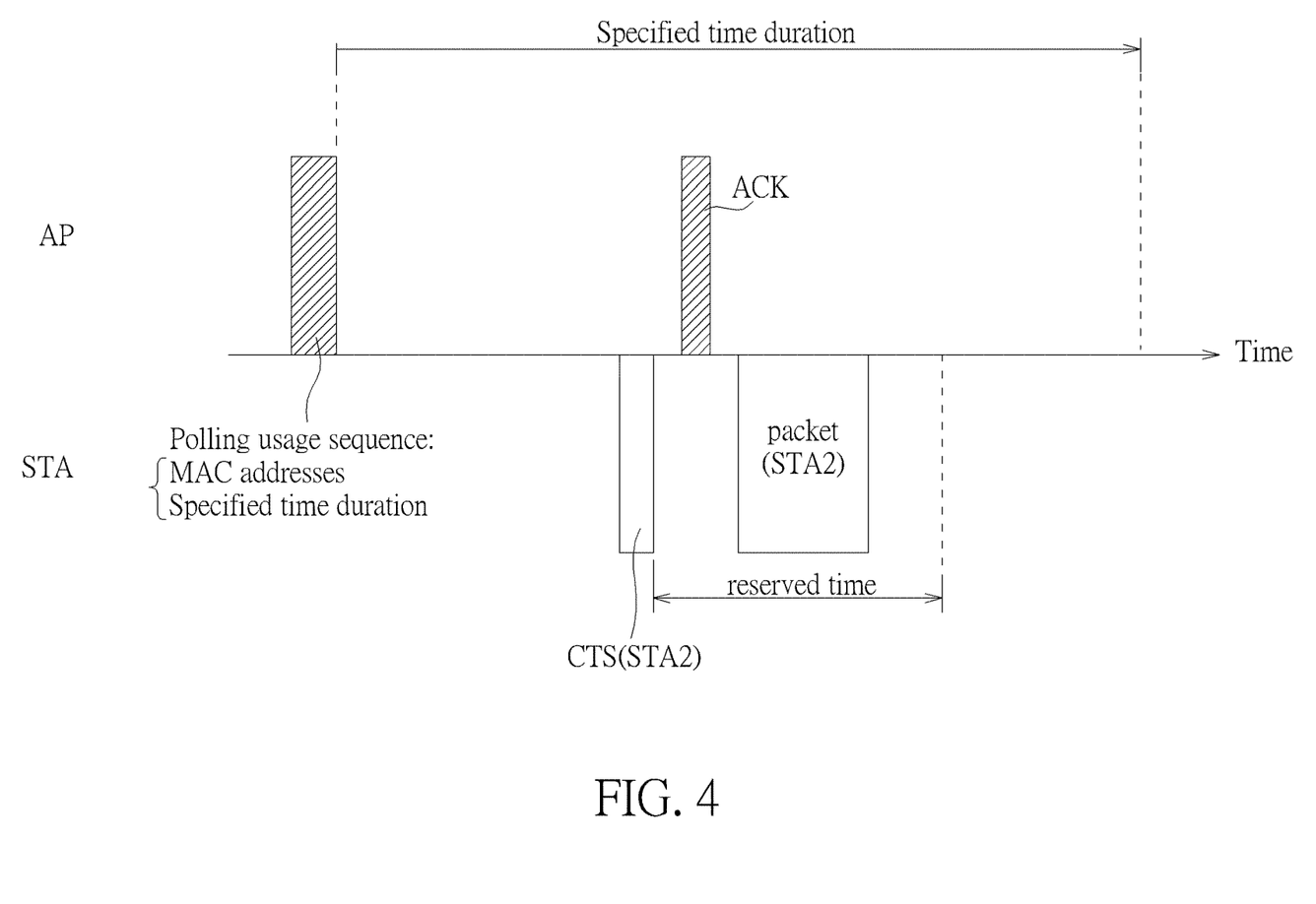
FIG. 4 is a diagram illustrating a timing diagram of communications between the AP and the stations according to another embodiment of the present invention.

By using the embodiment shown in FIG. 4, because the station STA2 sends the CTS to notify the other wireless device (hidden node of the AP 110) before the station STA2 starts to transmit the data packet to the AP 110, the other wireless device will not send the data packet to the station STA2 during the reserved time duration. Therefore, the collision issue caused by the hidden nodes problem can be avoided.

The embodiment shown in FIG. 4 can be regarded as a protection policy (hidden node protection), and the embodiments shown in FIG. 2 and FIG. 3 can be regarded as a no protection policy, and the stations STA1-STAn are allowed to switch between these two modes according to the indication of the AP 110. For example, the AP 110 may further broadcast a protection policy to assign a first mode or a second mode; and when the protection policy assigns the first mode and it is at the assigned time slot and the station is eligible to transmit the data packet, the station broadcasts the CTS packet to reserve a time duration, and the station transmits the data packet to the AP 110 after receiving an acknowledgement from the AP 110 (e.g. the embodiment shown in FIG. 4); and when the protection policy assigns the second mode and it is at the assigned time slot and the station is eligible to transmit the data packet, the station transmits the data packet to the access point, without broadcasting the CTS packet (e.g. the embodiments shown in FIG. 2).

Figure 5:
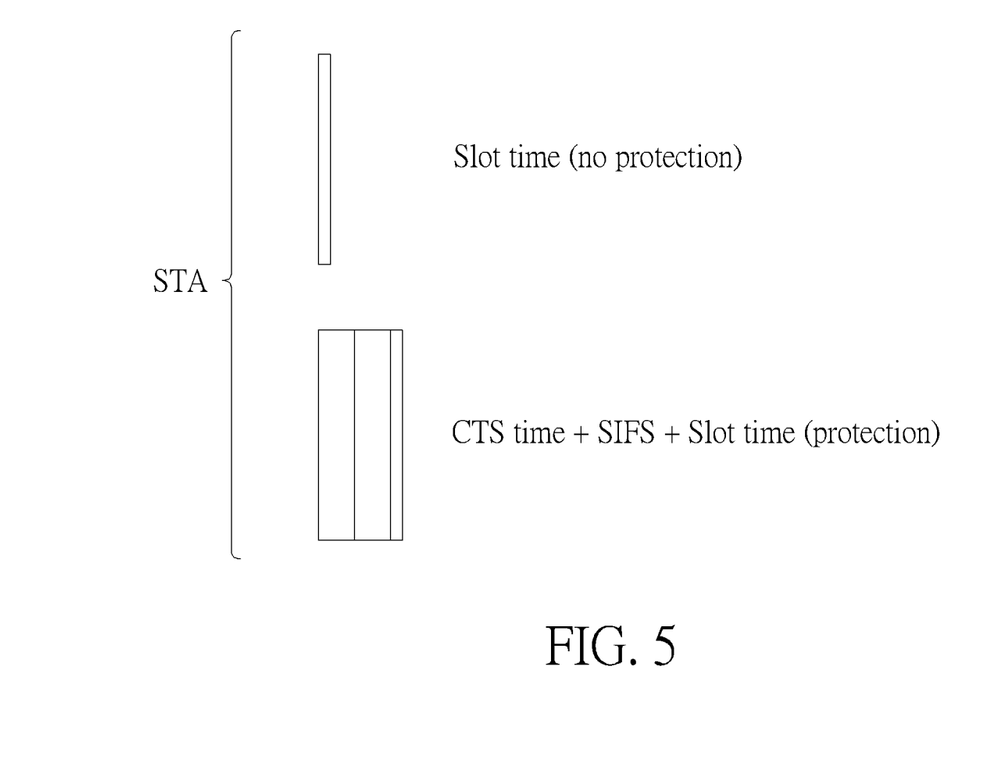
FIG. 5 shows different time countdowns according to one embodiment of the present invention.

In addition, because of different modes adopted by the stations STA1-STAn, the time countdown for these two modes may be different. In detail, refer to FIG. 5, if the protection policy is not adopted, each time count down only correspond to a single slot time; and if the protection policy is adopted, the time count down corresponding to the assigned time slot comprises a CTS time, a SIFS and a slot time. This permits all stations to allow an appropriate amount of time.

In one embodiment, the AP 110 can broadcast a packet to terminate the polling process. For example, taking the embodiment shown in FIG. 2 as an example, after the station STA2 finishes the data transmission, the AP 110 can send the packet to the stations STA1 and STA3 to terminate the polling process, that is the stations STA1 and STA3 will not transmit the data packet to the AP 110 until a next polling usage sequence is received.

In addition, before broadcasting the polling usage sequence, the AP 110 may determine whether the stations STA1-STAn support the protocol of the embodiment of the present invention. For example, without limitation, each of the stations STA1-STAn may signal a capability of supporting the disclosed protocol upon initial association with the network; or the capability may be paired with other capacities of protocol; or the AP 110 may exchange management frames with the stations STA1-STAn to query whether they are capable; or the AP 110 may infer the capability of the stations STA1-STAn via trial and error.

Briefly summarized, in the embodiments of present invention, because the access point actively broadcasts the polling usage sequence to assign time slots to the stations, and each station only transmits the data packet to the access point at its assigned time slot, the protocol overhead can be reduced. In addition, by using the protection policy, the embodiments allow more efficient polling of stations in environments characterized by overlapping networks and hidden nodes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication system under a contention-based protocol, comprising:
   an access point; and
   at least one station, for wirelessly communicating with the access point under the contention-based protocol;
   wherein the access point broadcasts a polling usage sequence to assign a time slot for the station, and the station subsequently uses the assigned time slot to transmit a data packet to the access point;
   wherein a plurality of stations are wirelessly communicated with the access point under the contention-based protocol, and after the station transmits the data packet to the access point, the station broadcasts a polling sequence to at least one of the other stations to notify that it is allowed to communicate with the access point;

wherein when it is at the assigned time slot and the station is eligible to transmit the data packet, the station broadcasts a reservation packet to reserve a time duration, and the station only uses a portion of the time duration to transmit the data packet to the access point, and a remaining portion of the time duration reserved by the station is for data transmission between the at least one of the other stations and the access point.

2. The wireless communication system of claim 1, wherein the time slot is determined and assigned by the access point, and the station is not involve with the determination of the time slot.

3. The wireless communication system of claim 1, wherein a plurality of stations are wirelessly communicated with the access point under the contention-based protocol, and the polling usage sequence broadcasted by the access point comprises a sequence of Media Access Control (MAC) addresses or a sequence of partial MAC addresses of the plurality of stations, and a specified time duration for data transmission of the stations; and the sequence or MAC addresses or the sequence partial addresses serve as assigned time slots of the stations.

4. The wireless communication system of claim 1, wherein when it is at the assigned time slot and the station is eligible to transmit the data packet, the station determines whether a wireless medium is busy or not, and the station transmit the data packet to the access point only when the wireless medium is not busy.

5. The wireless communication system of claim 4, wherein when the wireless medium is busy, the station does not transmit the data packet to the access point, and the station is not eligible to transmit the data packet until the access point broadcasts a next polling usage sequence to assign another time slot for the station.

6. The wireless communication system of claim 1, when it is at the assigned time slot and the station is eligible to transmit the data packet, the station broadcasts a clear-to-send (CTS) packet to reserve a time duration, and the station transmits the data packet to the access point after receiving an acknowledgement from the access point.

7. The wireless communication system of claim 1, wherein the access point further broadcasts a protection policy to assign a first mode or a second mode; and when the protection policy assigns the first mode and it is at the assigned time slot and the station is eligible to transmit the data packet, the station broadcasts a clear-to-send (CTS) packet to reserve a time duration, and the station transmits the data packet to the access point after receiving an acknowledgement from the access point; and when the protection policy assigns the second mode and it is at the assigned time slot and the station is eligible to transmit the data packet, the station directly transmits the data packet to the access point, without broadcasting the CTS packet.

8. A wireless communication method of a wireless device using a contention-based protocol, comprising:
wirelessly receiving a polling usage sequence that assigns a time slot for the wireless device;
when it is at the assigned time slot and the wireless device is eligible to transmit the data packet:
broadcasting a reservation packet to reserve a time duration;
using the assigned time slot and only using a portion of the time duration to transmit a data packet to an access point; and
after transmitting the data packet to the access point, broadcasting a polling sequence to another wireless device to notify that it is allowed to communicate with the access point, wherein a remaining portion of the time duration reserved by the wireless device is for data transmission between the other wireless devices and the access point.

9. The wireless communication method of claim 8, wherein the time slot is determined and assigned by the access point, and the wireless device is not involve with the determination of the time slot.

10. The wireless communication method of claim 8, wherein the polling usage sequence comprises a sequence of Media Access Control (MAC) addresses or a sequence of partial MAC addresses, and a specified time duration for data transmission; and a sequence number of a specific MAC addresses or partial MAC addresses, corresponding to the wireless device, serves as the assigned time slot of the wireless device.

11. The wireless communication method of claim 8, wherein when it is at the assigned time slot and the wireless device is eligible to transmit the data packet, the wireless device determines whether a wireless medium is busy or not, and the wireless device transmit the data packet to the access point only when the wireless medium is not busy.

12. The wireless communication method of claim 11, wherein when the wireless medium is busy, the wireless device does not transmit the data packet to the access point, and the wireless device is not eligible to transmit the data packet until receiving a next polling usage sequence that assigns another time slot for the wireless device.

13. The wireless communication method of claim 8, wherein the step of using the assigned time slot to transmit the data packet to an access point comprises:
when it is at the assigned time slot and the wireless device is eligible to transmit the data packet:
broadcasting a clear-to-send (CTS) packet to reserve a time duration; and
transmitting the data packet to the access point after receiving an acknowledgement from the access point.

14. A wireless device using a contention-based protocol, comprising:
a circuitry configured to:
wirelessly receiving a polling usage sequence that assigns a time slot for the wireless device;
when it is at the assigned time slot and the wireless device is eligible to transmit the data packet:
broadcasting a reservation packet to reserve a time duration;
using the assigned time slot and only using a portion of the time duration to transmit a data packet to an access point; and
after transmitting the data packet to the access point, broadcasting a polling sequence to another wireless device to notify that it is allowed to communicate with the access point, wherein a remaining portion of the time duration reserved by the wireless device is for data transmission between the other wireless devices and the access point.

15. The wireless device of claim 14, wherein the time slot is determined and assigned by the access point, and the wireless device is not involve with the determination of the time slot.

16. The wireless device of claim 14, wherein the polling usage sequence comprises a sequence of Media Access Control (MAC) addresses or a sequence of partial MAC addresses, and a specified time duration for data transmission; and a sequence number of a specific MAC addresses or partial MAC addresses, corresponding to the wireless device, serves as the assigned time slot of the wireless device.

<p style="text-align:center">* * * * *</p>